United States Patent [19]
Rendi, Jr.

[11] Patent Number: 5,748,395
[45] Date of Patent: May 5, 1998

[54] REAR VIEW MIRROR WITH STOWABLE DUAL VIEW MIRROR

[75] Inventor: Anthony J. Rendi, Jr., Canton, Mich.

[73] Assignee: Ford Global Technologies, Inc., Dearborn, Mich.

[21] Appl. No.: 847,805

[22] Filed: Apr. 28, 1997

Related U.S. Application Data

[63] Continuation of Ser. No. 539,897, Oct. 6, 1995.

[51] Int. Cl.$^6$ .................. G02B 5/08; G02B 7/182
[52] U.S. Cl. .................. 359/841; 359/850; 359/865
[58] Field of Search .................. 359/866, 860, 359/865, 843, 871, 872, 864, 841, 875

[56] References Cited

U.S. PATENT DOCUMENTS

| | | |
|---|---|---|
| 1,628,218 | 2/1927 | Beauchamp . |
| 2,582,651 | 1/1952 | Peterson . |
| 2,860,545 | 7/1958 | Herr et al. . |
| 3,048,084 | 11/1962 | Iannuzzi . |
| 3,519,335 | 7/1970 | Russell . |
| 3,644,021 | 2/1972 | Hamby .................. 359/854 |
| 4,453,759 | 6/1984 | Kathiria .................. 296/37.8 |
| 4,598,982 | 7/1986 | Levine .................. 359/865 |
| 4,695,138 | 9/1987 | Epstein .................. 369/864 |
| 4,702,572 | 10/1987 | Cossey .................. 359/876 |
| 4,718,756 | 1/1988 | Lancaster .................. 359/855 |
| 4,733,956 | 3/1988 | Erickson .................. 359/863 |
| 4,793,701 | 12/1988 | Brown .................. 359/865 |
| 4,802,751 | 2/1989 | Cleng . |
| 4,832,476 | 5/1989 | Gabrielyan .................. 359/865 |
| 4,852,986 | 8/1989 | Yu .................. 359/840 |
| 4,890,908 | 1/1990 | Casey .................. 359/865 |
| 4,906,088 | 3/1990 | Casey .................. 399/865 |
| 4,998,812 | 3/1991 | Hou .................. 359/841 |
| 5,106,177 | 4/1992 | Dolasia .................. 359/876 |
| 5,124,847 | 6/1992 | Gong .................. 359/865 |
| 5,182,675 | 1/1993 | Arbisi et al. .................. 359/841 |
| 5,210,655 | 5/1993 | Mishali .................. 359/850 |

FOREIGN PATENT DOCUMENTS

| | | |
|---|---|---|
| 36 09 449 | 3/1986 | Germany . |
| 59-137227 | 8/1984 | Japan . |
| 344650 | 3/1931 | United Kingdom . |

*Primary Examiner*—Paul M. Dzierynski
*Assistant Examiner*—Mark A. Robinson
*Attorney, Agent, or Firm*—David B. Kelley

[57] ABSTRACT

A dual rearview mirror system has a secondary rearview mirror separately adjustable with respect to a primary rearview mirror and stowable within a housing to which the primary mirror is mounted. The secondary mirror is positioned for viewing a separate field of vision by a deployment mechanism, such as a push-push latching arrangement, which allows the secondary mirror to descend from its stowed position by pushing on an exposed surface while permitting stowage by pushing on that same surface to force the secondary mirror into a cavity within the housing. In the stowed position, the secondary mirror is hidden from sight.

6 Claims, 4 Drawing Sheets

REAR VIEW MIRROR WITH STOWABLE DUAL VIEW MIRROR

This is a continuation of application Ser. No. 08/539,897 filed Oct. 6, 1995.

FIELD OF THE INVENTION

The present invention relates generally to rear view mirrors for automotive vehicles, and, more specifically to a rear view mirror having at least two separately adjustable mirrors.

BACKGROUND OF THE INVENTION

Vehicle drivers at times may desire more than one field of vision in the rearward direction. One such instance occurs when a driver wishes to view vehicles in adjacent lanes, for example to check if it is clear to change lanes. To this end, mirrors having separately adjustable reflecting surfaces for rear viewing have been developed. Patents for such mirrors mounted inside a vehicle include U.S. Pat. No. 4,718,756 (Lancaster) and U.S. Pat. No. 4,832,476 (Gabrielyan). For outside rearview mirrors, patents showing separately adjustable mirrors include U.S. Pat. No. 4,890,908 (Casey) and U.S. Pat. No. 4,906,088 (Casey).

In addition to rear viewing outside the vehicle, drivers may also desire a field of vision to the rear within the vehicle. A driver may desire, for example, to view occupants in the rear seat, such as children, as discussed in U.S. Pat. No. 4,733,956 (Erickson) and U.S. Pat. No. 4,702,572 (Cossey).

The aforementioned mirrors typically achieve their desired objective by having a primary mirror for reflecting one field of view and a separately adjustable secondary mirror for reflecting a second field of view. The secondary mirror is usually attached or clipped to the primary mirror. A drawback of these mirrors in which the secondary mirror is permanently attached to the primary mirror is lack of convenient stowage of the secondary mirror. That is, when only one field of vision is desired, the secondary mirror cannot be conveniently moved to a position so as not to distract the driver, or is moved to an aesthetically unappealing position. For those mirrors in which the secondary mirror is clipped or temporary attached to the primary mirror, there is no convenient place to store the secondary mirror when removed from the primary mirror. Clip-on type mirrors can be easily misplaced or lost.

SUMMARY OF THE INVENTION

The present invention overcomes the problems and disadvantages of the related art by providing a secondary rearview mirror separately adjustable with respect to a primary rearview mirror and stowable within a housing to which the primary mirror is mounted. The secondary mirror is positioned for viewing a separate field of vision by deployment means, such as a push-push latching arrangement, which allows the secondary mirror to descend from its stowed position by pushing on an exposed surface while permitting stowage by pushing on that same surface to force the secondary mirror into a cavity within the housing. In the stowed position, the secondary mirror is hidden from sight.

The dual rear view mirror assembly of the present invention has a housing with a cavity therein and an opening in a bottom surface thereof, along with attachment means, such as a rod, for attaching the housing to an internal surface of the passenger compartment, such as the inner surface of the windshield. A first mirror is attached on a side of the housing, generally facing a rear portion of the vehicle so as to reflect a first field of view. A second mirror is attached to the housing for movement between a stowed position within the cavity and a deployed position external of the cavity, the second mirror being separately adjustable with respect to the first mirror so as to reflect a second field of view when in the deployed position. Operating means, such as the push-push arrangement, moves the second mirror between the stowed position within the cavity through the opening in the bottom surface of the housing to the deployed position for reflection of the second field of view.

An advantage of the present invention is a dual rear view mirror system which provides a convenient stowage location for a secondary mirror within the primary mirror housing.

Another advantage is a dual rear view mirror system in which a mechanism allows easy movement of a secondary mirror between a stowed position within the housing of the primary mirror and a deployed position for viewing a field of vision different from that of the primary mirror.

Still another advantage of the present invention is a dual mirror system which provides a primary mirror for viewing a first field of visison and a separately adjustable secondary mirror for viewing a second field of vision.

Yet another advantage is a dual rear view mirror system which is inexpensive to manufacture and convenenient to operate.

A feature of the present invention is a dual rearview mirror system having a housing with a cavity therein for receiving a secondary mirror when in a stowed position.

Another feature is a push-push mechanism which moves a secondary mirror between the stowed position within the mirror housing and a deployed position external of the housing.

Yet another feature is an opening in the bottom surface of the housing, leading to the cavity for stowage of the secondary mirror.

Yet still another feature is a slot along the bottom surface of the housing for allowing the second mirror to slide transversely with respect to the primary mirror.

BRIEF DESCRIPTION OF THE DRAWINGS

These and other objects, advantages, and features of the present invention will be apparent to those skilled in the automotive mirror arts upon reading the following description with reference to the accompanying drawings, in which.

DETAILED DESCRIPTION OF THE PREFERRED EMBODIMENT

Figure 1:
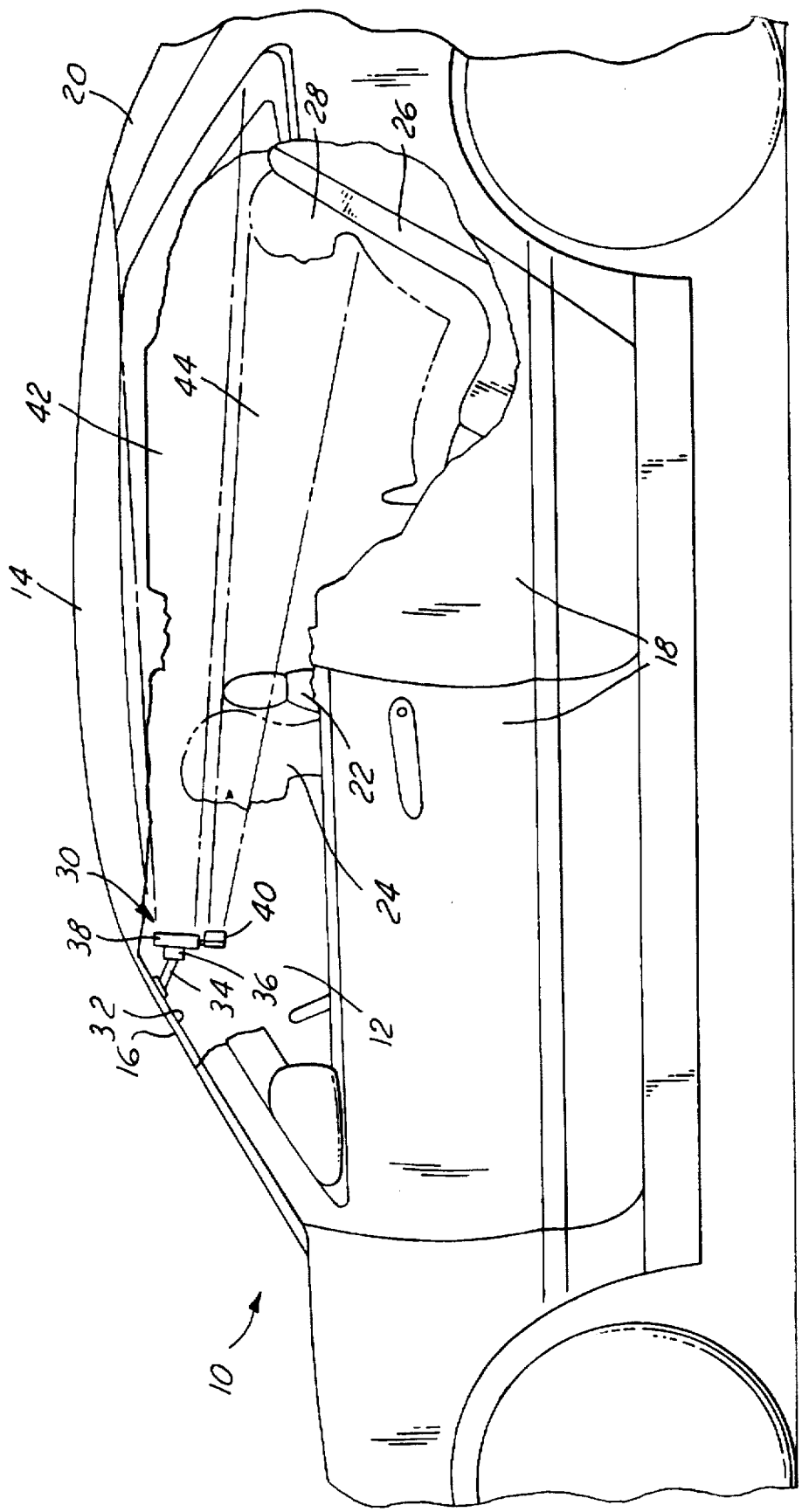
FIG. 1 is a perspective view from the interior of an automotive vehicle passenger compartment showing a dual rearview mirror according to the present invention.

Turning now to the drawings, and in particular to FIG. 1 thereof, an automotive vehicle 10 is shown having a passenger compartment 12 bounded by a roof 14, a windshield 16, doors 18, and a rear window 20. The passenger compartment 12 has a front seat 22, which may seat a driver 24, and a rear seat 26, which may seat a child 28. As previously discussed, vehicle drivers at times may desire more than one field of vision in the rearward direction, for example, to view occupants in the rear seat 26, such as a child 28. To provide two fields of view for a driver 24, a dual rearview mirror 30 according to the present invention is attached to an inner surface of the passenger compartment 12, such as the inner surface 32 of the windshield 16. The support can be attached with a rod 34 attached to a pedestal 36 on a forward facingy surface of the mirror, which for purposes of FIG. 1 is to the left.

Figure 2:
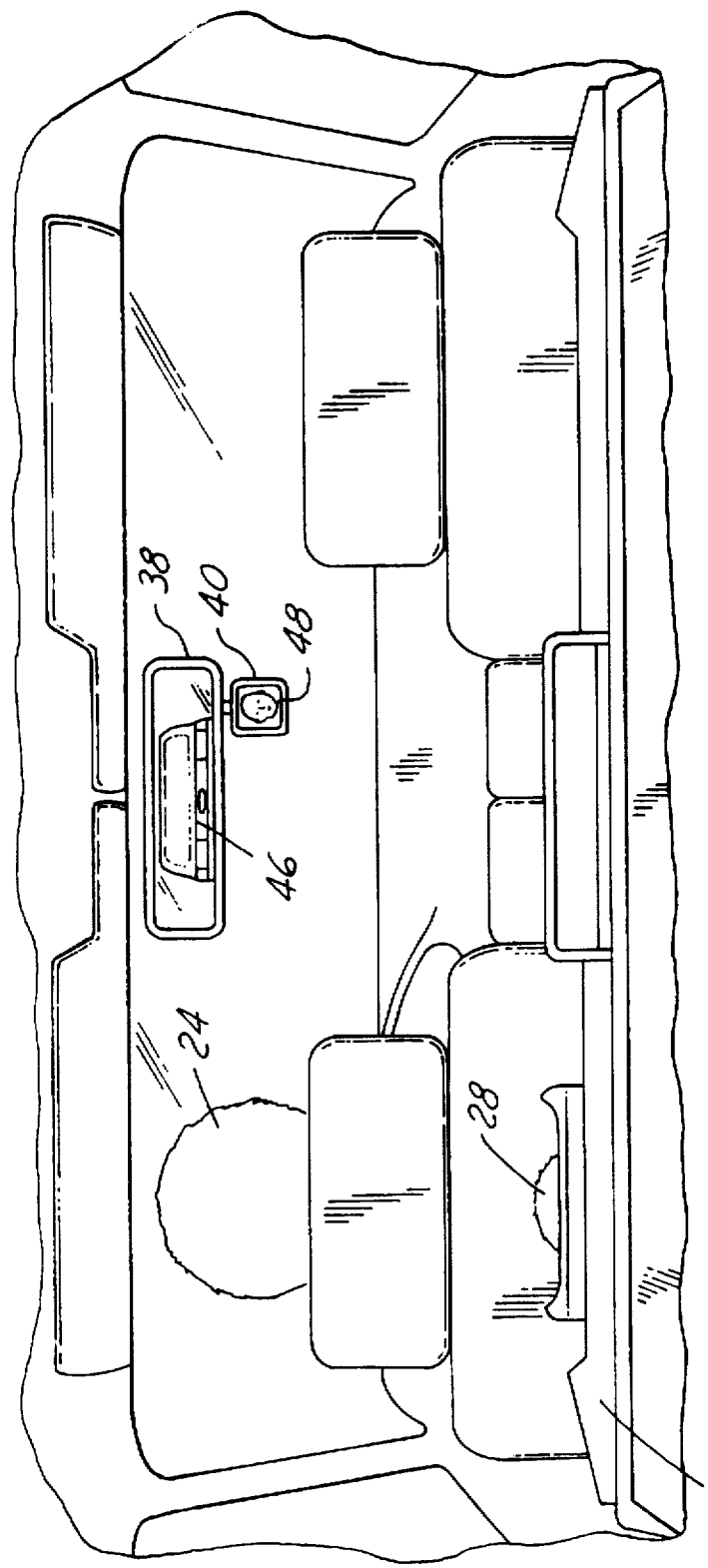
FIG. 2 is a side view of a vehicle passenger compartment showing a dual rearview mirror system of the present invention with a first mirror for reflecting a first field of view and a second deployable mirror for reflecting a second field of view.

Still referring to FIG. 1, the dual rearview mirror 30 has a primary mirror 38 and a secondary mirror 40 with reflective surfaces which generally face the rear of the vehicle 10, which is to the right. Such an arrangement yields two fields of view for a driver 24, a first field of view, designated generally as 42, from the primary mirror, and a second field of view from the secondary mirror, generally designated as 44. As better seen in FIG. 2, the dual rearview mirror system 30 affords the driver 24 the opportunity to view two fields of vision to the rear, such as a following automobile 46 in the primary mirror 38, and a reflection 48 of the child 28 in the rear seat 26 as reflected in the secondary mirror 40.

Figure 3:
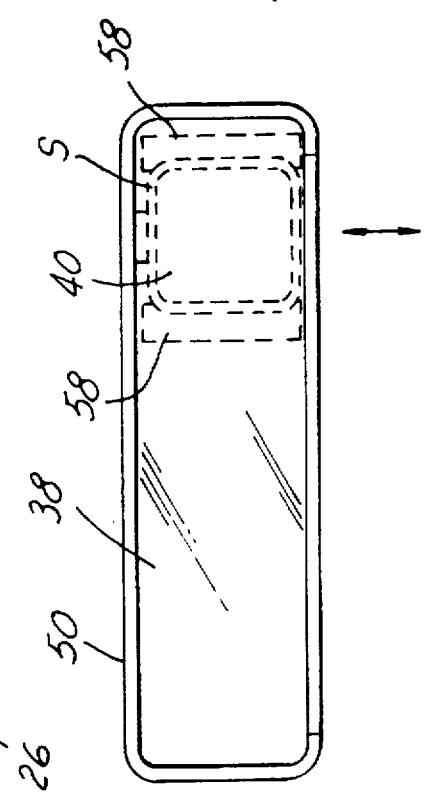
FIG. 3 is a front view of a dual rearview mirror system according to the present invention showing a secondary mirror in a stowed position within a cavity in the housing of a primary mirror.
Figure 4:
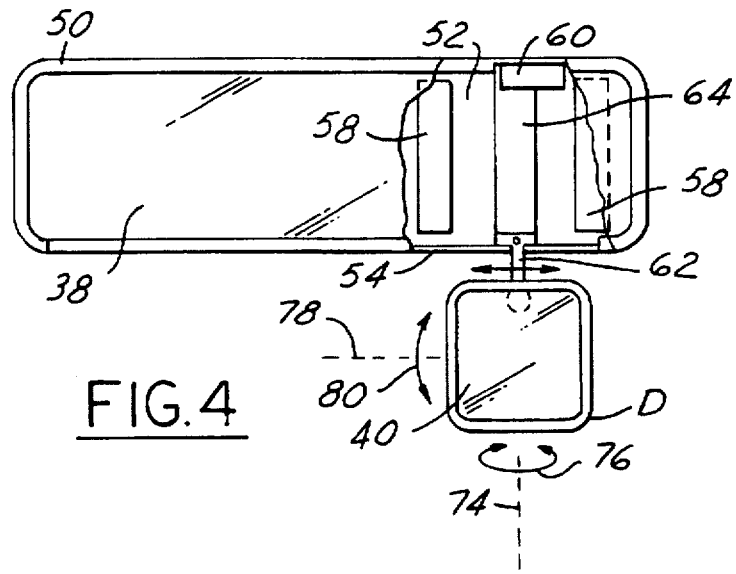
FIG. 4 is a front view similar to FIG. 3 but showing the secondary mirror in a deployed position.

Turning now to FIGS. 3–4, the dual rearview mirror system 30 is seen having a housing 50 with a cavity 52 for receiving the secondary mirror 40 therein. An opening 54 in a bottom surface 56 of the housing 50 leads to the cavity 52 and allows the secondary mirror 40 to move from a stowed position S, as seen by the dotted lines in FIG. 3, to a deployed position D (FIG. 4). The primary mirror 38 is attached on a side of the housing 50 generally facing a rear portion of the vehicle so as to reflect the first field of view 42, as described above. The secondary mirror 40 is mounted within the housing 50 for movement between the stowed position S and the deployed position D external of the cavity 52 for reflection of the second field of view 44.

Figure 5:
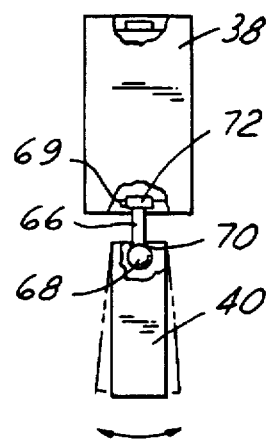
FIG. 5 is a side view of the dual rearview mirror system of FIG. 4.
Figure 7:
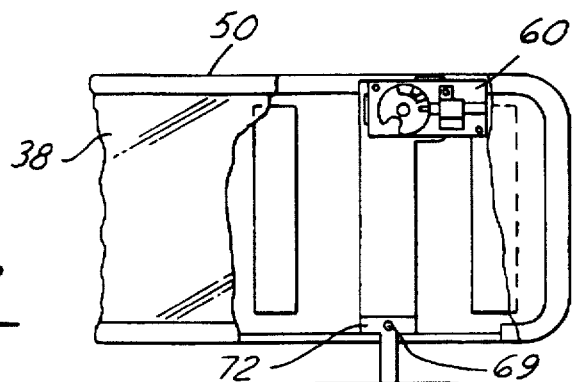
FIG. 7 is an enlarged view of a section of the dual rearview mirror assembly shown in FIG. 4.

A latching mechanism 60, further described below, operates to hold the secondary mirror 40 in the stowed position S and to allow the secondary mirror to descend to the deployed position D when pushed by an operator. The latching mechanism 60 latches the secondary mirror 40 when moved from the deployed position D to the stowed position S. As seen in FIG. 4, a pair of guides 58 direct the secondary mirror 40 when moving into and out of the cavity 52 between the stowed position S and the deployed position D. An extension member 62 fits into a channel 64 within the cavity 52 for connection with the housing 50 to allow the second mirror 40 to be deployed to and held within the deployed position D. The extension member 62 preferably comprises a rod 66 having a ball 68 thereon which fits into a socket 70 in the second mirror 40 (FIG. 5). A base poriton 72 having a peripheral area wider than the diameter of the rod 66 prevents the secondary mirror 40 from detaching from the primary mirror 38, thus preventing it from becoming lost or misplaced. A latch pin 69 on the base member 72 cooperates with the latching mechanism 60 as described below (FIGS. 5 and 7).

In addition to holding the primary and secondary mirrors together, the extension member 62 allows the second mirror be adjusted separately from the primary mirror 38 to attain the second field of view 44 when in the deployed position D. The ball 68 and socket 70 arrangement permit the secondary mirror 40 to rotate around a generally vertical axis 74 of the housing 50, as indicated by arrow 76 (FIG. 4), as well as to rotate with respect to a generally horizontal axis 78 of the housing 50, as indicated by arrow 80 (FIGS. 4–5). The secondary mirror 40 can thus be separately adjusting with respect to the primary mirror 38 so as to reflect the second field of view 44 when in the deployed position D. The primary mirror 38 can be moved to adjust the field of view 42 (FIG. 1) in a manner known by those skilled in the art and suggested by this disclosure.

Figure 6:
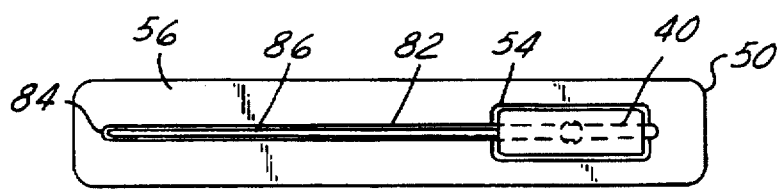
FIG. 6 is a bottom view of a dual rearview mirror system of the present invention.

To permit additional flexibility for a driver when selecting the second field of view 44, the housing 50 preferably has a transversly running slot 82 in the bottom surface 56 (FIG. 6). The slot 82 is connected with the opening 54 for allowing movement of the rod 66 of the extension member 62 therealong so as to permit the secondary mirror 40 to move transversely with respect to the primary mirror 38. In a preferred embodiment, the slot 82 has detent means associated therewith for deterring movement of the rod 66 within the slot 82. Such a feature holds the secondary mirror 40 in the stationary position selected by the driver along the slot 82. The detent means can comprise, for example, a flexible rubber member 84 (FIG. 6) which fits within the slot 82, the rubber member 84 having a slit 86 along approximately the length of the slot 82 for receiving the rod 66.

Figure 8:
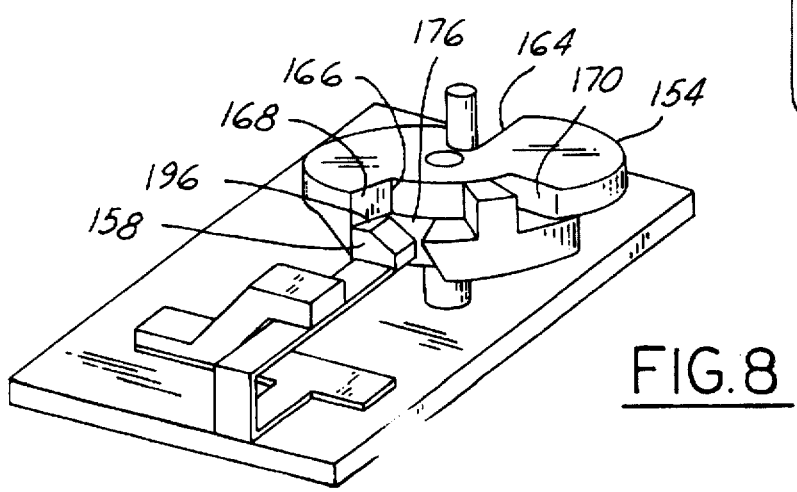
FIG. 8 is a perspective view of a latch mechanism for the secondary mirror of the present invention shown in a latched position.

Preferably, the latch mechanism 60 is a push-push type arrangement, which for purposes of this disclosure is defined as a latch assembly similar to that described in U.S. Pat. No. 4,453,759 (Kathiria), assigned to the assignee of the present invention and incorporated herein by reference. The latch mechanism 60 cooperates with the pin 69 on the secondary mirror 40 to axially secure the secondary mirror 40 within the housing 50 upon upward movement to the stowed position S, and to release the secondary mirror 40 for downward movement to the deployed position D after certain further upward movement. Operation of the latch mechanism 60 is described in substantially the same way as in the Kathiria patent. In the stowed position S, upward movement of the secondary mirror 40 causes engagement of the latch pin 69 in slot 164 of upper cam member 154 to route cam member 154 to the position shown wherein open sectors 166, 176 register and locking cam 158 is in a full upward position (FIG. 8). Downward movement of the secondary mirror 40 is resisted since flat surface 196 of locking cam 158 is thereby abuttingly engaged by surface 168 of upper cam member 154.

Figure 9:
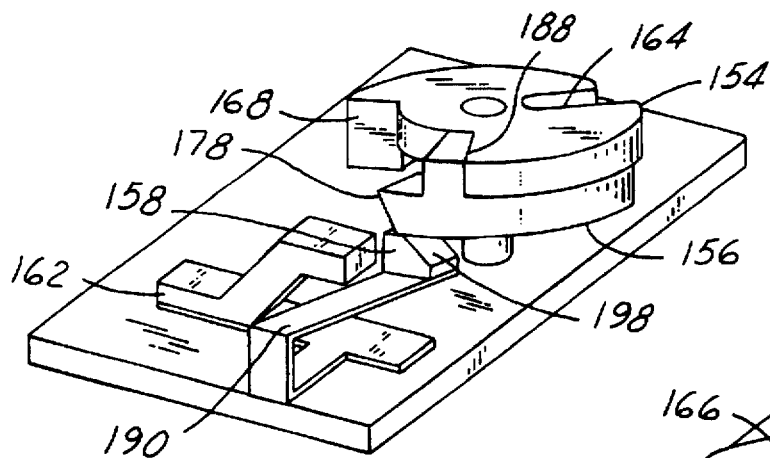
FIG. 9 is a perspective view similar to FIG. 8 shown when the secondary mirror is positioned fully upward for latching.
Figure 10:
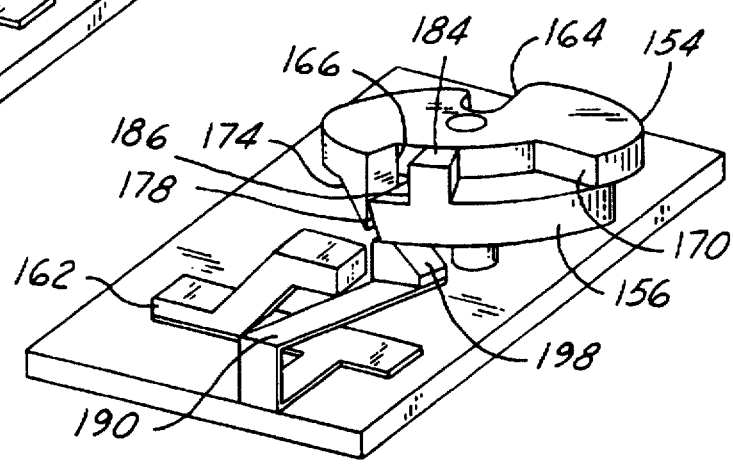
FIG. 10 is a perspective view similar to FIG. 9 shown when the secondary mirror is moved downward.

Upon further upward movement of the secondary mirror 40, the latch pin 69 further rotates the upper cam member 154 to the position shown in FIG. 9 as surface 170 of upper cam member 154 engages surface 188 of lower cam dog 184 to rotate lower cam member 156 for engagement of complementary canted surfaces 178 of lower cam member 156 and 198 of locking cam 158. This depresses the arm 190 of support 162, disengaging the locking cam 158 and permitting downward movement of the secondary mirror 40 through counterrotation of the upper cam member 154 as seen in FIG. 10.

Figure 11:
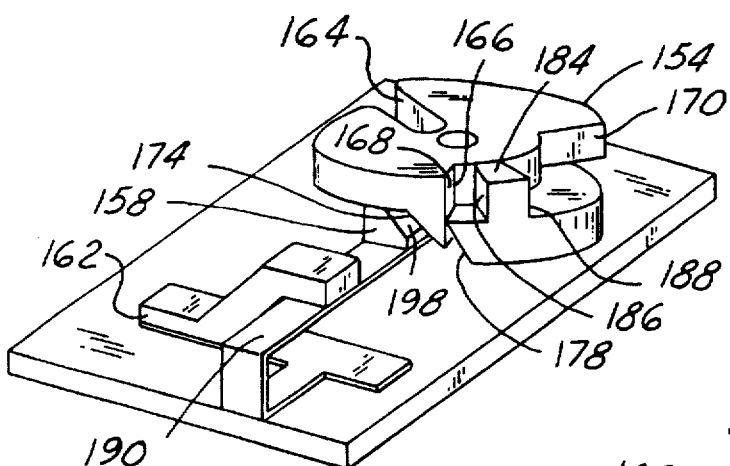
FIG. 11 is a perspective view similar to FIG. 10 shown when the secondary mirror is moving downwardly free of the latch mechanism.

As the secondary mirror 40 moves sufficiently forward so that the pin 69 leaves the slot 164, surface 168 urges the lower cam member 156 to the position shown in FIG. 11 releasing the locking cam 158 to its full upward position beneath upper cam member 154.

Figure 12:
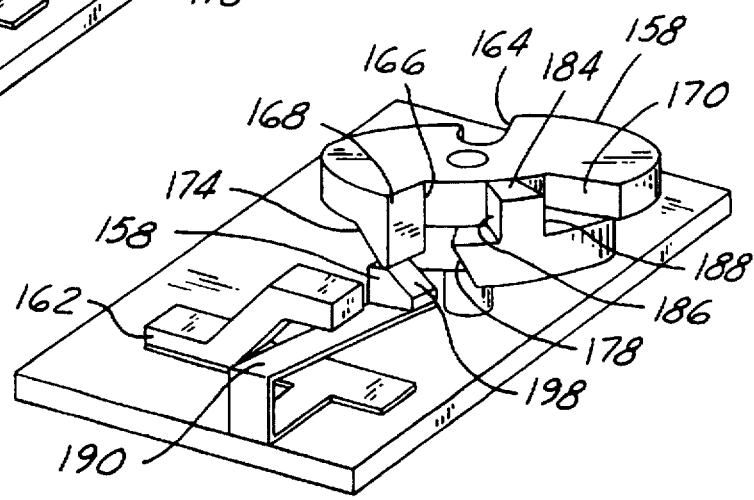
FIG. 12 is a perspective view similar to FIG. 11 shown when the secondary mirror is moving upward to relatch.

Subsequent upward movement of the secondary mirror 40 to a position wherein pin 69 again engages slot 164 rotates the upper cam member 154 to slide canted surface 174 of upper cam member 154 against canted surface 198 of locking cam 158 to depress the arm 190 as shown in FIG. 12 until the latched position of FIG. 8 is again reached.

Although the preferred embodiment of the present invention has been disclosed, various changes and modifications may be made without departing from the scope of the invention as set forth in the appended claims.

I claim:

1. A dual plane rear view mirror assembly for a passenger compartment of an automotive vehicle, comprising:

a housing having a cavity therein with an opening in a bottom surface thereof leading to the cavity and a transversely running slot on the bottom of the housing connected with the opening;

attachment means for attaching said housing to an internal surface of the passenger compartment;

a first mirror attached on a side of the housing generally facing a rear portion of the vehicle so as to reflect a first field of view from a first plane;

a second mirror attached to the housing for movement between a stowed position concealed within the cavity and a second field of view from a second plane;

a rod attached on a first end to the first mirror and on a second end to the second mirror, the first end having a ball thereon fitted into a socket in the second mirror for receiving the ball therein to allow the second mirror to rotate and pivot with respect to the first mirror when in the deployed position, the rod movable within the slot when the second mirror is in the deployed position so as to permit the second mirror to be transversely adjustable with respect to the first mirror; and a latch mechanism for latching the second mirror in the stowed position and for allowing movement of the secondary mirror between the stowed position and the deployed position.

2. A rearview mirror assembly as defined in claim 1 wherein the second mirror is adjustable with respect to both a generally vertical axis and a generally horizontal axis of the first mirror.

3. A dual rearview mirror assembly as defined in claim 1 wherein the latch mechanism operating means comprises a push-push mechanism which latches the secondary mirror within the cavity when in the stowed position and unlatches the secondary mirror when pushed to allow the secondary mirror to move to the deployed position.

4. A dual rearview mirror assembly as defined in claim 1 wherein the second mirror is below the first mirror when in the deployed position.

5. A dual rearview mirror assembly as defined in claim 1 wherein the slot has detent means associated therewith for deterring movement of the rod within the slot.

6. A dual rearview mirror assembly as defined in claim 5 wherein the detent means comprises a flexible rubber member which fits within the slot, the rubber member having a slit along the length of the slot for receiving the rod.

* * * * *